US012779993B2

(12) United States Patent
Seo et al.

(10) Patent No.: US 12,779,993 B2
(45) Date of Patent: Nov. 3, 2026

(54) APPARATUS FOR DETECTING WARNING LIGHT AND DISPLAYING ALTERNATIVE WARNING LIGHT, AND METHOD FOR THE SAME

(71) Applicant: HYUNDAI MOBIS CO., LTD., Seoul (KR)

(72) Inventors: Jun Seong Seo, Yongin-si (KR); Sang Kyeong Lee, Hwaseong-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 267 days.

(21) Appl. No.: 18/756,242

(22) Filed: Jun. 27, 2024

(65) Prior Publication Data

US 2025/0170957 A1 May 29, 2025

(30) Foreign Application Priority Data

Nov. 28, 2023 (KR) ........................ 10-2023-0167484

(51) Int. Cl.

| | |
|---|---|
| ***B60K 35/22*** | (2024.01) |
| ***B60K 35/53*** | (2024.01) |
| ***B60K 35/81*** | (2024.01) |
| ***B60Q 3/16*** | (2017.01) |
| ***B60Q 11/00*** | (2006.01) |

(52) U.S. Cl.

CPC ............ *B60K 35/223* (2024.01); *B60K 35/22* (2024.01); *B60K 35/53* (2024.01); *B60K 35/81* (2024.01); *B60Q 3/16* (2017.02); *B60Q 11/005* (2013.01); *B60K 2360/178* (2024.01)

(58) Field of Classification Search

CPC ...... B60K 35/223; B60K 35/22; B60K 35/53; B60K 35/81; B60K 2360/178; B60Q 3/16; B60Q 11/005

See application file for complete search history.

(56) References Cited

U.S. PATENT DOCUMENTS

| | | | | |
|---|---|---|---|---|
| 9,338,170 | B2 * | 5/2016 | Ricci | G06F 13/14 |
| 11,718,175 | B2 * | 8/2023 | Ha | B60K 35/81 701/36 |
| 2019/0244446 | A1 | 8/2019 | Murzyn | |
| 2020/0218487 | A1 | 7/2020 | Rush et al. | |
| 2022/0126692 | A1 | 4/2022 | Tanaka | |
| 2023/0049671 | A1 | 2/2023 | Cheng et al. | |
| 2023/0302903 | A1 | 9/2023 | Watanabe et al. | |
| 2025/0265028 | A1 * | 8/2025 | Tsujino | B60K 35/81 |

OTHER PUBLICATIONS

Extended European Search Report dated Apr. 3, 2025 issued in corresponding European Patent Application No. 24192763.1.

* cited by examiner

*Primary Examiner* — John A Tweel, Jr.

(74) *Attorney, Agent, or Firm* — Morgan Lewis & Bockius LLP

(57) ABSTRACT

An apparatus for detecting non-lighting of a warning light is disclosed. A warning-light display apparatus for detecting non-lighting of a warning light includes an integrated display device configured to include a cluster window and a multimedia window, and an integrated controller operatively connected to the integrated display device and configured to control the integrated display device. In response to a reception of an event-related signal for triggering a display of the warning light, the integrated controller transmits the event-related signal to an application for the cluster window and an application for the multimedia window and determines whether a warning light corresponding to the event-related signal is displayed on the cluster window.

15 Claims, 9 Drawing Sheets

631

APPARATUS FOR DETECTING WARNING LIGHT AND DISPLAYING ALTERNATIVE WARNING LIGHT, AND METHOD FOR THE SAME

This application claims the benefit of Korean Patent Application No. 10-2023-0167484, filed on Nov. 28, 2023, which is hereby incorporated by reference as if fully set forth herein.

BACKGROUND OF THE DISCLOSURE

Field of the Disclosure

The embodiments of the present disclosure relate to a vehicle, and more particularly to an apparatus and method for determining whether a warning light is displayed on an integrated monitor of a vehicle and displaying an alternative warning light on a portion of the integrated monitor when the warning light is not turned on.

Discussion of the Related Art

As technology of electric vehicles and technology of autonomous driving have rapidly developed, it is expected that various occupants (hereinafter referred to as "users") will be able to engage in various activities within the vehicle. For example, a user may be a fallback-ready user (FRU) and thus be able to watch video or moving images or participate in video conferences, as long as he or she remains aware of the vehicle's surroundings and can be ready for fallback.

With the advent of the autonomous driving era, various sensors are being installed within vehicles. For example, cameras, microphone sensors, and heat detection sensors may be installed to check objects within the vehicle.

Within the above-described environment, it is expected that there will be a need for ways to provide interfaces for users in vehicles in various ways.

SUMMARY OF THE DISCLOSURE

According to the above-mentioned background, as integrated monitors have rapidly become popular in vehicles, the present disclosure provides a method for guaranteeing the safety of lighting operation of one or more warning lights of a vehicle in the integrated monitors. The integrated monitor may be referred to as an integrated screen, an integrated display device, etc., and may be controlled by an integrated controller that can integrally control a cluster and a multimedia monitor instead of by a cluster controller that controls the cluster where the warning light was turned on. When there occurs an unexpected operation in which the warning light is not turned on, there is a need to implement a countermeasure for the warning light not lighting by using the integrated controller.

Technical subjects to be solved by the present disclosure are not limited to the above-mentioned technical solutions, and it should be noted that other technical subjects not described above can be understood by those skilled in the art from the description of the present disclosure below.

In accordance with an embodiment of the present disclosure, an apparatus for detecting non-lighting of a warning light may include: an integrated display device configured to include a cluster window and a multimedia window; and an integrated controller operatively connected to the integrated display device and configured to control the integrated display device. The integrated controller is configured to, in response to a reception of an event-related signal for triggering a display of the warning light, transmit the event-related signal to a first application for the cluster window and a second application for the multimedia window; and determine whether a warning light corresponding to the event-related signal is displayed on the cluster window.

In accordance with another embodiment of the present disclosure, a method for detecting non-lighting of a warning light, the method being performed by an apparatus that includes an integrated display device having a cluster window and a multimedia window and an integrated controller controlling the integrated display device may include: receiving an event-related signal for triggering a display of the warning light; transmitting the event-related signal to an application for the cluster window and an application for the multimedia window; and determining whether a warning light corresponding to the event-related signal is displayed on the cluster window.

The above-described solutions of the present disclosure are some of the embodiments of the present disclosure. Various solutions other than the above-described solutions can be derived and understood based on the detailed description of the present disclosure to be described below.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DETAILED DESCRIPTION OF THE DISCLOSURE

Figure 1:
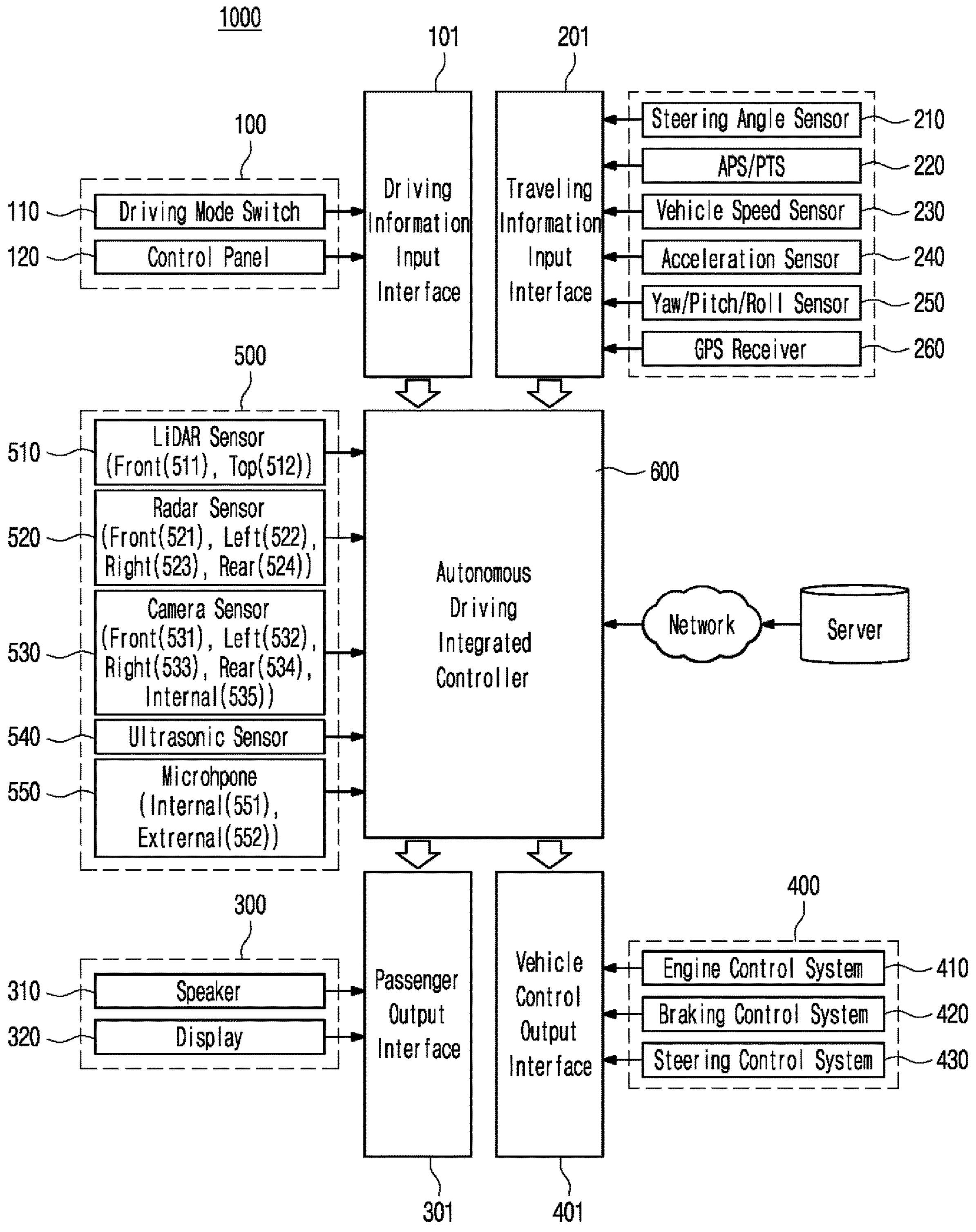
FIG. 1 is an overall block diagram illustrating an autonomous driving vehicle to which an autonomous driving device can be applied.

Hereinafter, embodiments of the present disclosure will be described in detail with reference to the accompanying drawings so that the present disclosure may be easily realized by those skilled in the art. However, the present disclosure may be achieved in various different forms and is not limited to the embodiments described herein. In the drawings, parts that are not related to a description of the present disclosure are omitted to clearly explain the present disclosure and similar reference numbers will be used throughout this specification to refer to similar parts.

In the specification, when a part “includes” an element, it means that the part may further include another element rather than excluding another element unless otherwise mentioned.

Figure 2:
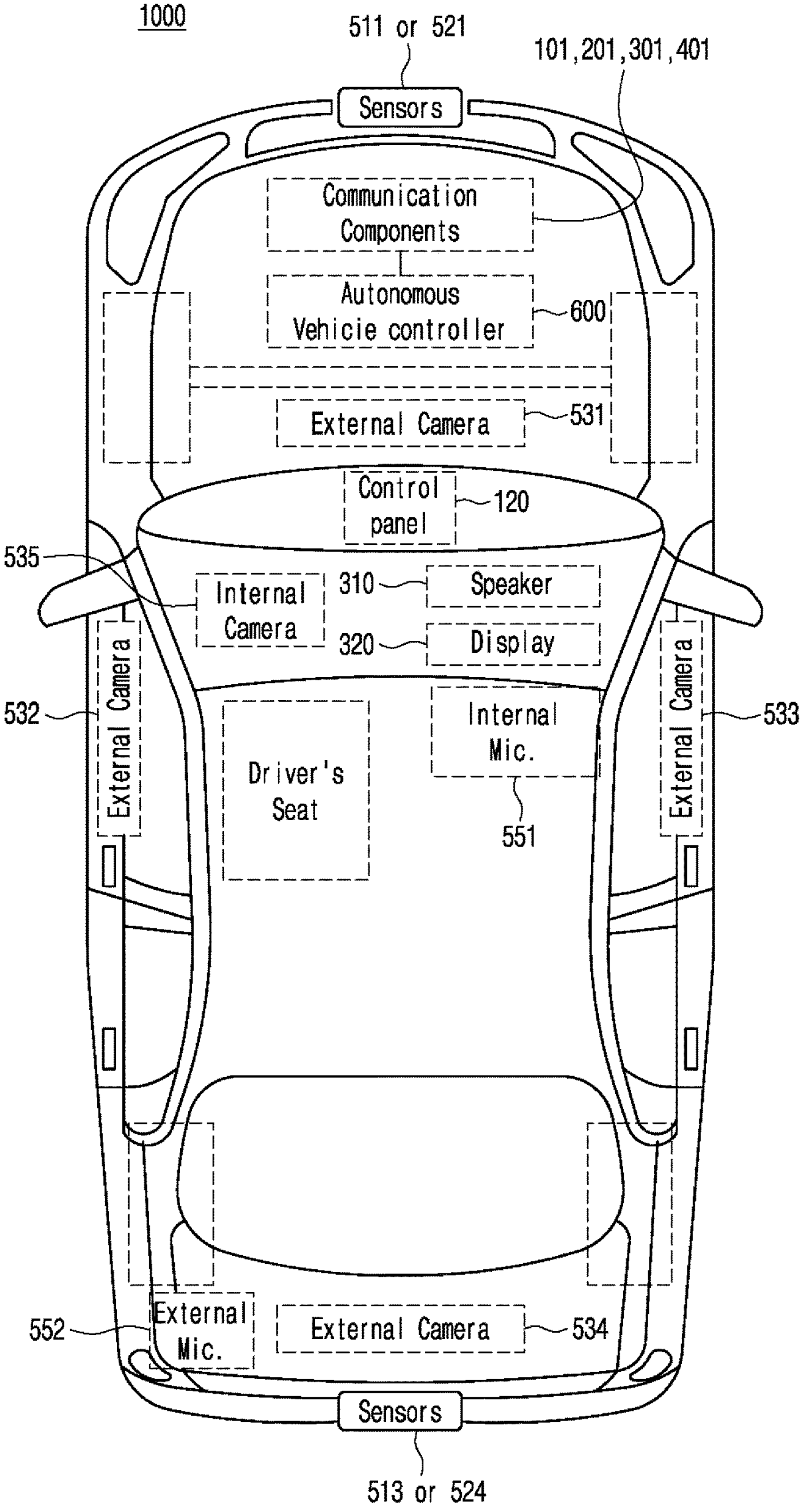
FIG. 2 is a diagram illustrating an example of an autonomous driving device applied to a vehicle.

FIG. 1 is an overall block diagram of an autonomous driving control system to which an autonomous driving apparatus according to any one of embodiments of the present disclosure is applicable. FIG. 2 is a diagram illustrating an example in which an autonomous driving apparatus according to any one of embodiments of the present disclosure is applied to a vehicle.

First, a structure and function of an autonomous driving control system (e.g., an autonomous driving vehicle) to which an autonomous driving apparatus according to the present embodiments is applicable will be described with reference to FIGS. 1 and 2.

As illustrated in FIG. 1, an autonomous driving vehicle 1000 may be implemented based on an autonomous driving integrated controller 600 that transmits and receives data necessary for autonomous driving control of a vehicle through a driving information input interface 101, a traveling information input interface 201, an occupant output interface 301, and a vehicle control output interface 401. However, the autonomous driving integrated controller 600 may also be referred to herein as a controller, a processor, or, simply, a controller.

The autonomous driving integrated controller 600 may obtain, through the driving information input interface 101, driving information based on manipulation of an occupant for a user input unit 100 in an autonomous driving mode or manual driving mode of a vehicle. As illustrated in FIG. 1, the user input unit 100 may include a driving mode switch 110 and a control panel 120 (e.g., a navigation terminal mounted on the vehicle or a smartphone or tablet computer owned by the occupant). Accordingly, driving information may include driving mode information and navigation information of a vehicle.

For example, a driving mode (i.e., an autonomous driving mode/manual driving mode or a sports mode/eco mode/safety mode/normal mode) of the vehicle determined by manipulation of the occupant for the driving mode switch 110 may be transmitted to the autonomous driving integrated controller 600 through the driving information input interface 101 as the driving information.

Furthermore, navigation information, such as the destination of the occupant input through the control panel 120 and a path up to the destination (e.g., the shortest path or preference path, selected by the occupant, among candidate paths up to the destination), may be transmitted to the autonomous driving integrated controller 600 through the driving information input interface 101 as the driving information.

The control panel 120 may be implemented as a touchscreen panel that provides a user interface (UI) through which the occupant inputs or modifies information for autonomous driving control of the vehicle. In this case, the driving mode switch 110 may be implemented as touch buttons on the control panel 120.

In addition, the autonomous driving integrated controller 600 may obtain traveling information indicative of a driving state of the vehicle through the traveling information input interface 201. The traveling information may include a steering angle formed when the occupant manipulates a steering wheel, an accelerator pedal stroke or brake pedal stroke formed when the occupant depresses an accelerator pedal or brake pedal, and various types of information indicative of driving states and behaviors of the vehicle, such as a vehicle speed, acceleration, a yaw, a pitch, and a roll formed in the vehicle. The traveling information may be detected by a traveling information detection unit 200, including a steering angle sensor 210, an accelerator position sensor (APS)/pedal travel sensor (PTS) 220, a vehicle speed sensor 230, an acceleration sensor 240, and a yaw/pitch/roll sensor 250, as illustrated in FIG. 1.

Furthermore, the traveling information of the vehicle may include location information of the vehicle. The location information of the vehicle may be obtained through a global positioning system (GPS) receiver 260 applied to the vehicle. Such traveling information may be transmitted to the autonomous driving integrated controller 600 through the traveling information input interface 201 and may be used to control the driving of the vehicle in the autonomous driving mode or manual driving mode of the vehicle.

The autonomous driving integrated controller 600 may transmit driving state information provided to the occupant to an output unit 300 through the occupant output interface 301 in the autonomous driving mode or manual driving mode of the vehicle. That is, the autonomous driving integrated controller 600 transmits the driving state information of the vehicle to the output unit 300 so that the occupant may check the autonomous driving state or manual driving state of the vehicle based on the driving state information output through the output unit 300. The driving state information may include various types of information indicative of driving states of the vehicle, such as a current driving mode, transmission range, and speed of the vehicle.

If it is determined that it is necessary to warn a driver in the autonomous driving mode or manual driving mode of the vehicle along with the above driving state information, the autonomous driving integrated controller 600 transmits warning information to the output unit 300 through the occupant output interface 301 so that the output unit 300 may output a warning to the driver. In order to output such driving state information and warning information acoustically and visually, the output unit 300 may include a speaker 310 and a display 320 as illustrated in FIG. 1. In this case, the display 320 may be implemented as the same device as the control panel 120 or may be implemented as an independent device separated from the control panel 120.

Furthermore, the autonomous driving integrated controller 600 may transmit control information for driving control of the vehicle to a lower control system 400, applied to the vehicle, through the vehicle control output interface 401 in the autonomous driving mode or manual driving mode of the vehicle. As illustrated in FIG. 1, the lower control system 400 for driving control of the vehicle may include an engine control system 410, a braking control system 420, and a steering control system 430. The autonomous driving integrated controller 600 may transmit engine control information, braking control information, and steering control information, as the control information, to the respective lower control systems 410, 420, and 430 through the vehicle control output interface 401. Accordingly, the engine control system 410 may control the speed and acceleration of the vehicle by increasing or decreasing fuel supplied to an engine. The braking control system 420 may control the braking of the vehicle by controlling braking power of the vehicle. The steering control system 430 may control the steering of the vehicle through a steering device (e.g., motor driven power steering (MDPS) system) applied to the vehicle.

As described above, the autonomous driving integrated controller 600 according to the present embodiment may obtain the driving information based on manipulation of the driver and the traveling information indicative of the driving state of the vehicle through the driving information input interface 101 and the traveling information input interface 201, respectively, and transmit the driving state information and the warning information, generated based on an autonomous driving algorithm, to the output unit 300 through the occupant output interface 301. In addition, the autonomous driving integrated controller 600 may transmit the control information generated based on the autonomous driving algorithm to the lower control system 400 through the vehicle control output interface 401 so that driving control of the vehicle is performed.

In order to guarantee stable autonomous driving of the vehicle, it is necessary to continuously monitor the driving state of the vehicle by accurately measuring a driving environment of the vehicle and to control driving based on the measured driving environment. To this end, as illustrated in FIG. 1, the autonomous driving apparatus according to the present embodiment may include a sensor unit 500 for detecting a nearby object of the vehicle, such as a nearby vehicle, pedestrian, road, or fixed facility (e.g., a signal light, a signpost, a traffic sign, or a construction fence).

The sensor unit 500 may include one or more of a LiDAR sensor 510, a radar sensor 520, or a camera sensor 530, in order to detect a nearby object outside the vehicle, as illustrated in FIG. 1.

The LiDAR sensor 510 may transmit a laser signal to the periphery of the vehicle and detect a nearby object outside the vehicle by receiving a signal reflected and returning from a corresponding object. The LiDAR sensor 510 may detect a nearby object located within the ranges of a preset distance, a preset vertical field of view, and a preset horizontal field of view, which are predefined depending on specifications thereof. The LiDAR sensor 510 may include a front LiDAR sensor 511, a top LiDAR sensor 512, and a rear LiDAR sensor 513 installed at the front, top, and rear of the vehicle, respectively, but the installation location of each LiDAR sensor and the number of LiDAR sensors installed are not limited to a specific embodiment. A threshold for determining the validity of a laser signal reflected and returning from a corresponding object may be previously stored in a memory (not illustrated) of the autonomous driving integrated controller 600. The autonomous driving integrated controller 600 may determine a location (including a distance to a corresponding object), speed, and moving direction of the corresponding object using a method of measuring time taken for a laser signal, transmitted through the LiDAR sensor 510, to be reflected and returning from the corresponding object.

The radar sensor 520 may radiate electromagnetic waves around the vehicle and detect a nearby object outside the vehicle by receiving a signal reflected and returning from a corresponding object. The radar sensor 520 may detect a nearby object within the ranges of a preset distance, a preset vertical field of view, and a preset horizontal field of view, which are predefined depending on specifications thereof. The radar sensor 520 may include a front radar sensor 521, a left radar sensor 522, a right radar sensor 523, and a rear radar sensor 524 installed at the front, left, right, and rear of the vehicle, respectively, but the installation location of each radar sensor and the number of radar sensors installed are not limited to a specific embodiment. The autonomous driving integrated controller 600 may determine a location (including a distance to a corresponding object), speed, and moving direction of the corresponding object using a method of analyzing power of electromagnetic waves transmitted and received through the radar sensor 520.

The camera sensor 530 may detect a nearby object outside the vehicle by photographing the periphery of the vehicle and detect a nearby object within the ranges of a preset distance, a preset vertical field of view, and a preset horizontal field of view, which are predefined depending on specifications thereof.

The camera sensor 530 may include a front camera sensor 531, a left camera sensor 532, a right camera sensor 533, and a rear camera sensor 534 installed at the front, left, right, and rear of the vehicle, respectively, but the installation location of each camera sensor and the number of camera sensors installed are not limited to a specific embodiment. The autonomous driving integrated controller 600 may determine a location (including a distance to a corresponding object), speed, and moving direction of the corresponding object by applying predefined image processing to an image captured by the camera sensor 530.

In addition, an internal camera sensor 535 for capturing the inside of the vehicle may be mounted at a predetermined location (e.g., rear view mirror) within the vehicle. The autonomous driving integrated controller 600 may monitor a behavior and state of the occupant based on an image captured by the internal camera sensor 535 and output guidance or a warning to the occupant through the output unit 300.

As illustrated in FIG. 1, the sensor unit 500 may further include an ultrasonic sensor 540 in addition to the LiDAR sensor 510, the radar sensor 520, and the camera sensor 530 and further adopt various types of sensors for detecting a nearby object of the vehicle along with the sensors.

FIG. 2 illustrates an example in which, in order to aid in understanding the present embodiment, the front LiDAR sensor 511 or the front radar sensor 521 is installed at the front of the vehicle, the rear LiDAR sensor 513 or the rear radar sensor 524 is installed at the rear of the vehicle, and the front camera sensor 531, the left camera sensor 532, the right camera sensor 533, and the rear camera sensor 534 are installed at the front, left, right, and rear of the vehicle, respectively. However, as described above, the installation location of each sensor and the number of sensors installed are not limited to a specific embodiment.

Furthermore, in order to determine a state of the occupant within the vehicle, the sensor unit 500 may further include a bio sensor for detecting bio signals (e.g., heart rate, electrocardiogram, respiration, blood pressure, body temperature, electroencephalogram, photoplethysmography (or pulse wave), and blood sugar) of the occupant. The bio sensor may include a heart rate sensor, an electrocardiogram sensor, a respiration sensor, a blood pressure sensor, a body temperature sensor, an electroencephalogram sensor, a photoplethysmography sensor, and a blood sugar sensor.

Finally, the sensor unit 500 additionally includes a microphone 550 having an internal microphone 551 and an external microphone 552 used for different purposes.

The internal microphone 551 may be used, for example, to analyze the voice of the occupant in the autonomous driving vehicle 1000 based on AI or to immediately respond to a direct voice command of the occupant.

In contrast, the external microphone 552 may be used, for example, to appropriately respond to safe driving by analyzing various sounds generated from the outside of the autonomous driving vehicle 1000 using various analysis tools such as deep learning.

For reference, the symbols illustrated in FIG. 2 may perform the same or similar functions as those illustrated in FIG. 1. FIG. 2 illustrates in more detail a relative positional relationship of each component (based on the interior of the autonomous driving vehicle 1000) as compared with FIG. 1.

The present disclosure proposes a new method for satisfying requirements for functional safety related to clusters for vehicles.

The cluster may have a warning light (also referred to as "telltale") lighting function that receives signals through CAN communication and displays the received signals on a cluster display. Examples of functional safety requirements for these warning lights (telltales) are as follows:

Unintentional non-lighting of the warning lights should be prevented, (which varies depending on vehicle specifications)

The warning lights (telltales) include:

IFS (AFS) telltale—Auto-hold telltale (yellow)—MDPS telltale—Airbag telltale—EPB telltale—Master Symbol (Stop Lamp short-circuiting)—Battery telltale, etc.

Dissatisfaction with these requirements may lead to a hazardous situation caused by the driver's ignorance of vehicle conditions.

Figure 3:
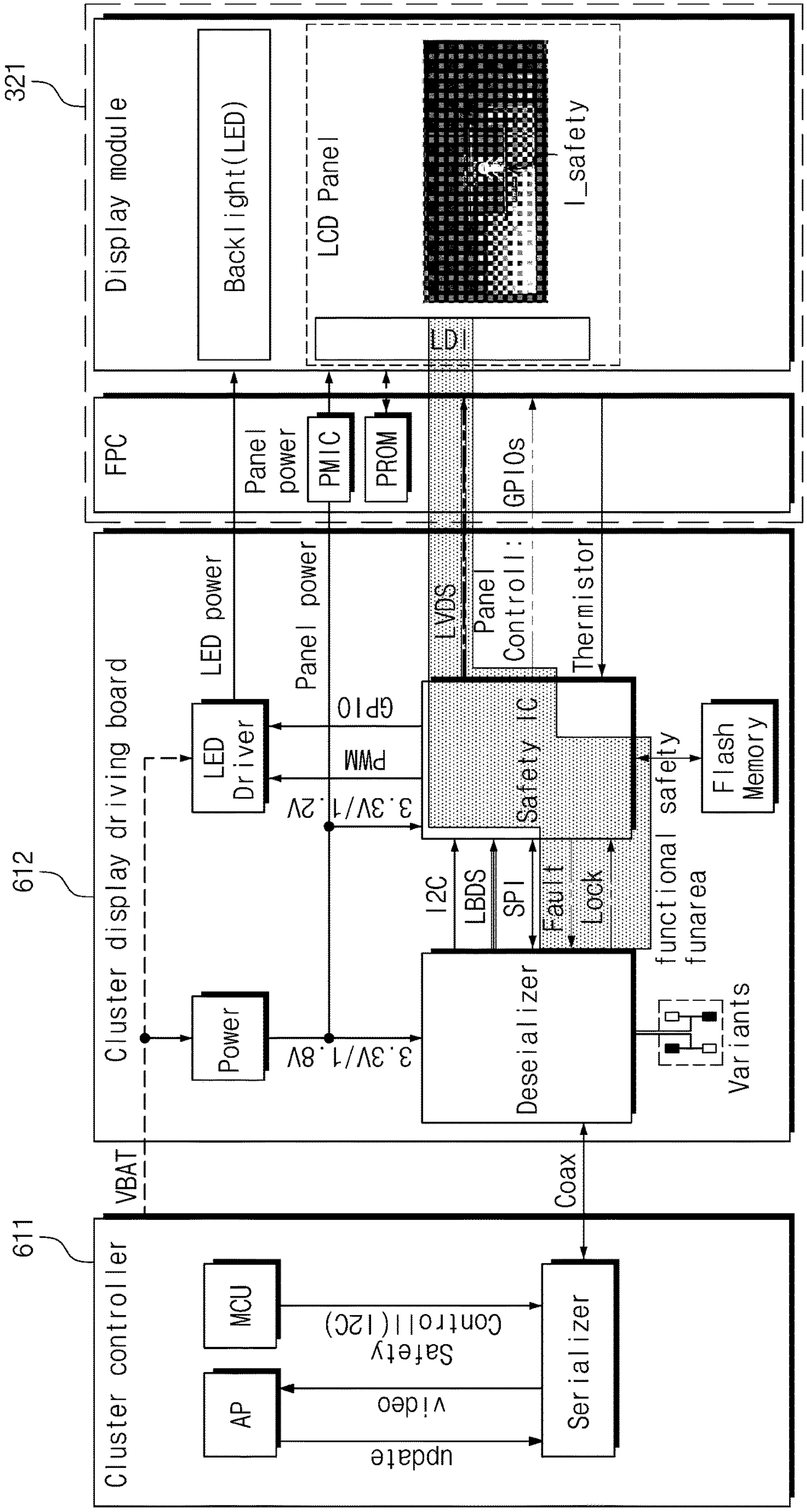
FIG. 3 (PRIOR ART)
FIG. 3 is a diagram illustrating an example structure of a conventional vehicle cluster and a safety structure for coping with failure or malfunction of a vehicle.

FIG. 3 is a diagram illustrating an example structure of a conventional vehicle cluster and a safety structure for coping with failure or malfunction of a vehicle.

In the case of a conventional vehicle cluster, a cluster controller 611 may be connected to a cluster display driving board 612 to drive a display module 321. The cluster controller 611 and the cluster display driving board 612 may be collectively referred to as a cluster platform 610.

Referring to FIG. 3, a safety integrated circuit (IC) located at the center of the cluster display driving board 611 may detect a safety OSD (On Screen Display) image error, and may include a safety structure that enables a separate pre-stored warning light (I_safety) to be output to the display module 321.

Figure 4A:
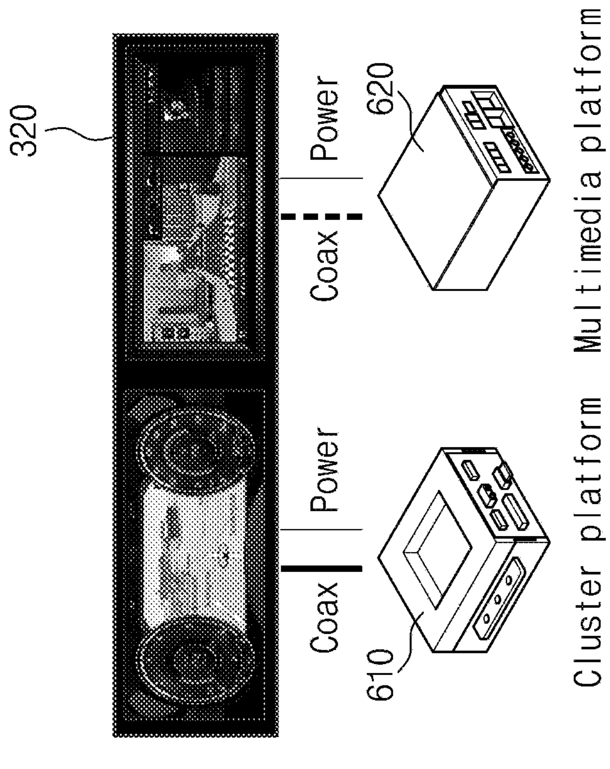
FIG. 4A and FIG. 4B are diagrams illustrating a difference between a control structure for a vehicle cluster and multimedia integrated monitor according to the related art and a control structure for an integrated monitor according to the present disclosure.
Figure 4B:
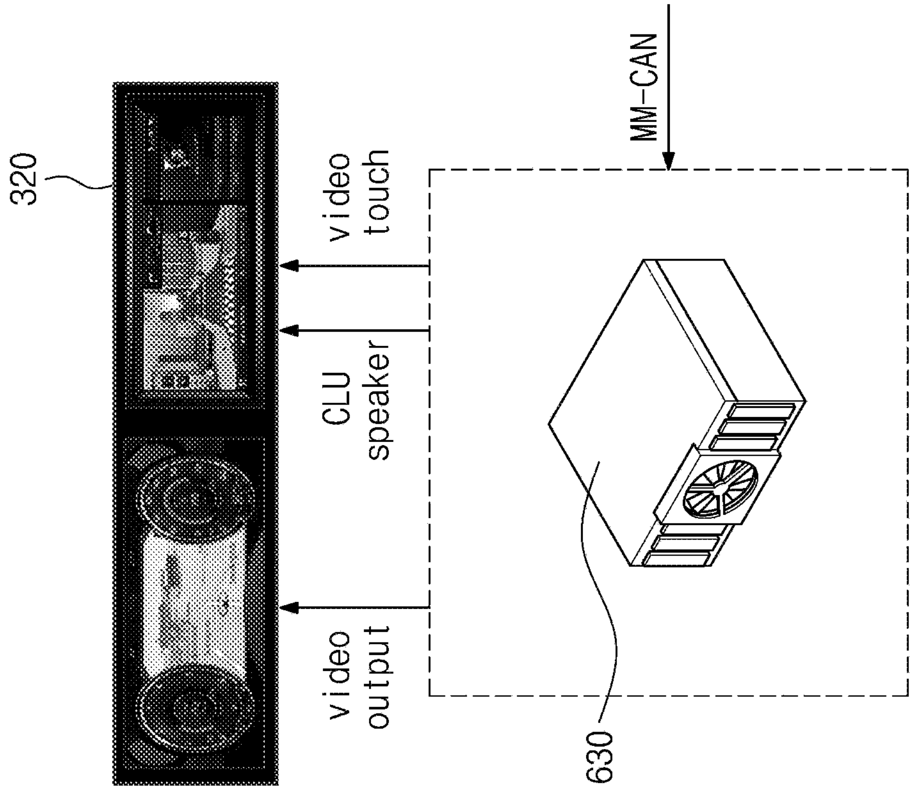

FIG. 4A and FIG. 4B are diagrams illustrating a difference between a control structure for a vehicle cluster and multimedia integrated monitor according to the related art and a control structure for an integrated monitor according to the present disclosure.

FIG. 4A is a diagram illustrating a structure in which a multimedia platform 620 is added to the structure of FIG. 3. The integrated monitor 320 may display cluster information on the left side thereof, and may display multimedia information on the right side thereof. The multimedia platform 620 may drive and control the multimedia information display area (hereinafter referred to as "multimedia window) on the right side of the multimedia platform 620.

The term "integrated monitor" may refer to a single display that displays all of cluster information, information related to a navigation, audio, and communication device, and/or vehicle-related information, and multimedia information required to display images or video. However, the above single display does not necessarily mean one physically integrated display panel. The integrated monitor may be referred to by several terms including an integrated screen, an integrated cluster, an integrated display device, etc.

Referring to FIG. 4A, according to the related art, although the integrated monitor 320 is introduced into the vehicle, the cluster platform 610 and the multimedia platform 620 may be separately provided.

On the other hand, referring to FIG. 4B, the integrated controller 630 may drive and control the integrated monitor 320. The present disclosure seeks to propose a new method related to lighting or non-lighting of the warning lights (telltales) in the driving and control structure of the integrated monitor shown in FIG. 4B.

Figure 5:
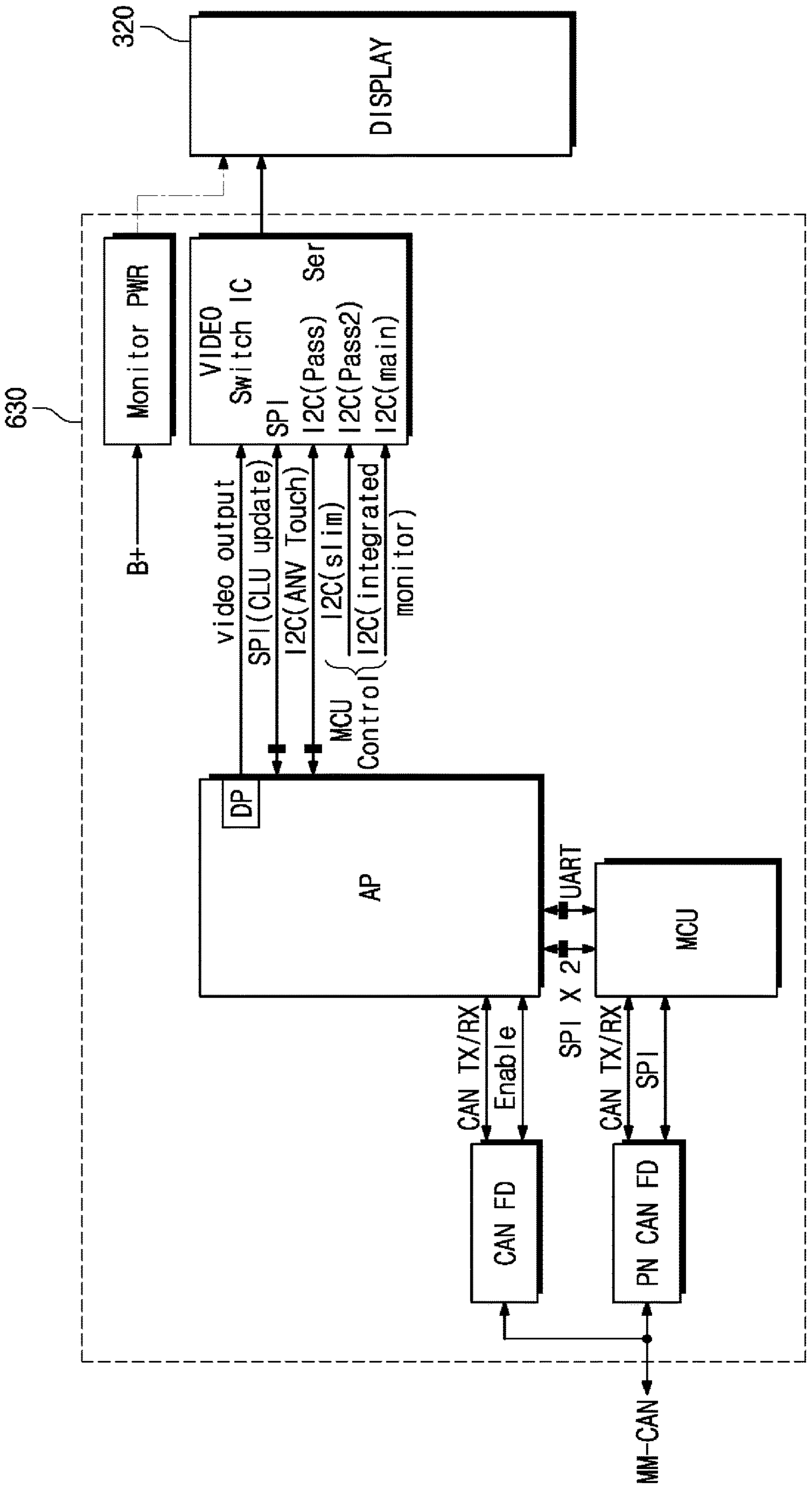
FIG. 5 is a diagram illustrating a detailed structure for integrated control according to the present disclosure.

FIG. 5 is a diagram illustrating a detailed structure for integrated control according to the present disclosure. Driving and controlling the integrated monitor in the structure shown in FIG. 4B may be referred to as "integrated control". The integrated controller 630 may be provided for integrated control, which basically adopts a method of processing CAN data in one access point (AP). At this time, in order to respond to functional safety, software for driving a virtual machine such as a hypervisor or a logical configuration for the same may be installed or implemented on the AP. Each function may operate in each virtual machine or may be implemented in each virtual machine.

Figure 6:
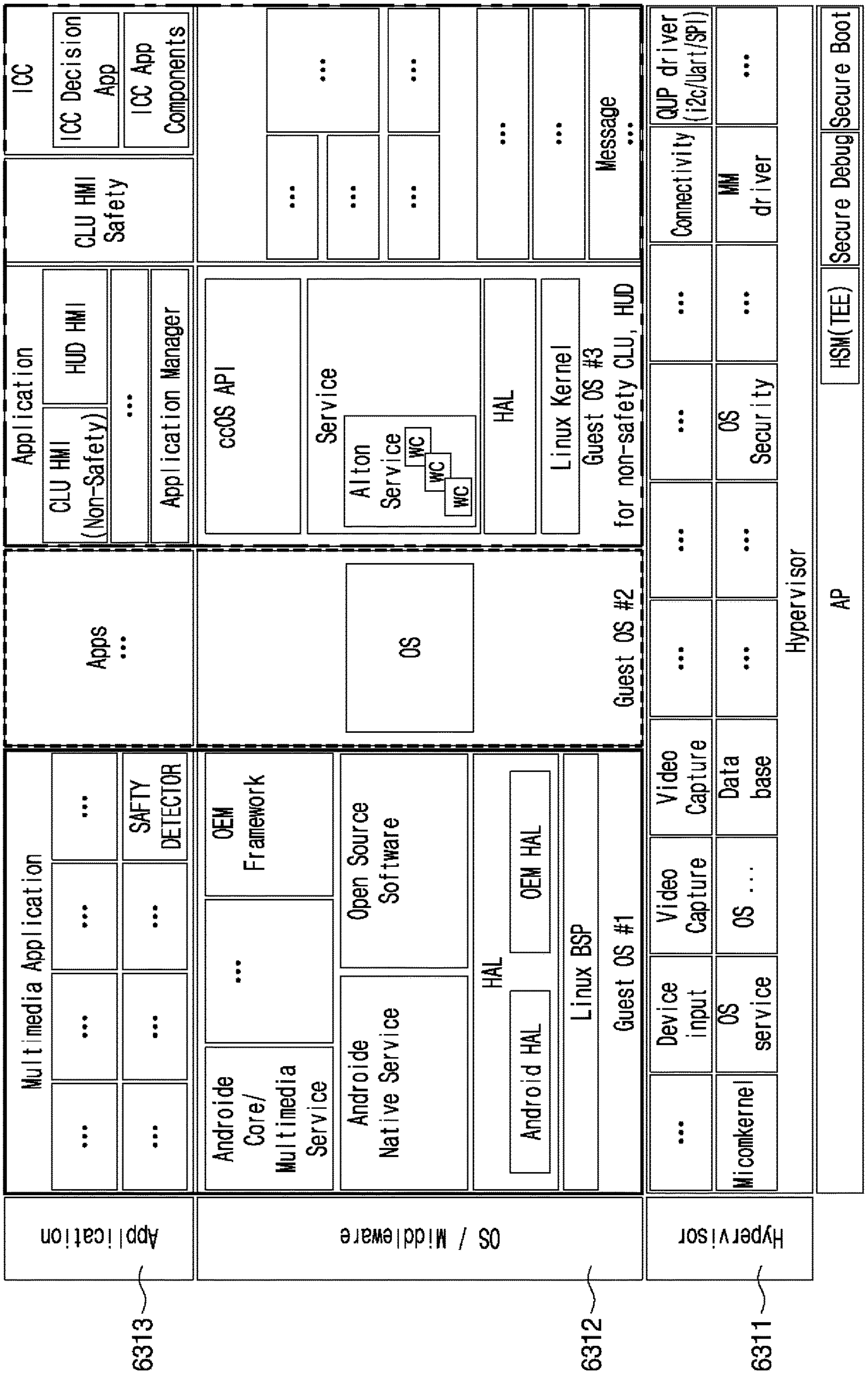
FIG. 6 is a diagram illustrating a software structure for integrated control according to the present disclosure.

FIG. 6 is a diagram illustrating a software structure or logical structure for integrated control according to the present disclosure. FIG. 6 is a diagram illustrating a software structure or logical structure 631 installed or implemented on the AP of the integrated controller 630 according to the present disclosure.

Referring to FIG. 6, a hypervisor layer 6311, an operating system (OS)/middleware layer 6312, and an application layer 6313 may be configured on the AP. To drive multiple virtual machines using a hypervisor, multiple guest operating systems (Oss) are implemented or installed in the operating system (OS)/middleware layer 6312, and the hypervisor may act as a host. Referring to FIG. 6, three guest OSs may be implemented or installed in the operating system (OS)/middleware layer 6312, where the guest (OS #1) may be for multimedia and the guest (OS #3) may be for the cluster. Applications for each guest are installed or implemented on each guest OS.

Figure 7:
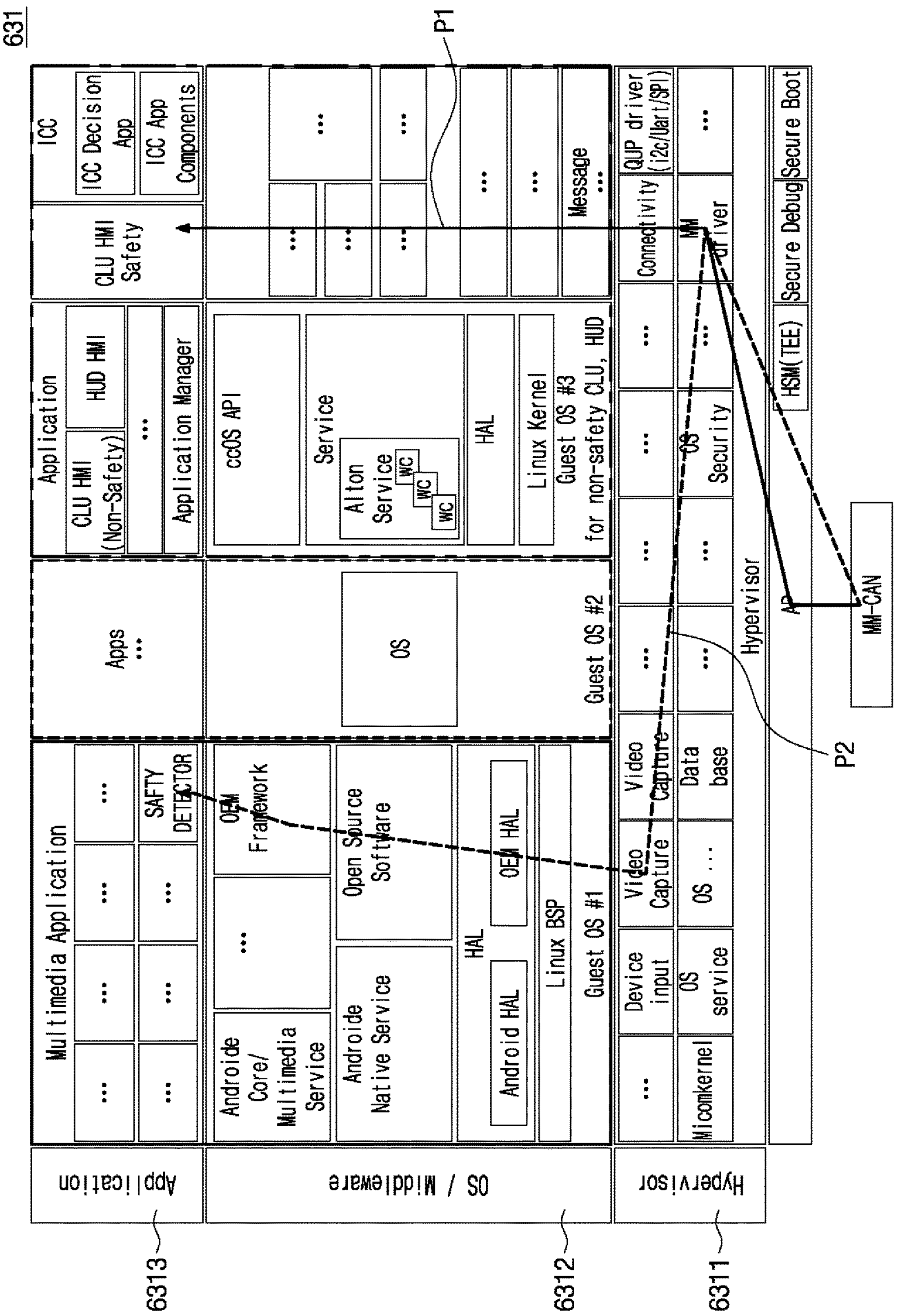
FIG. 7 is a dual transmission structure of signals related to a warning light trigger event according to the present disclosure.

FIG. 7 is a dual transmission structure of signals related to a telltale (warning light) trigger event according to the present disclosure.

Referring to FIG. 7, P1 may represent a transmission path of signals related to the telltale trigger event through CAN communication. The cluster telltale function may be designed to operate when a specific signal is transmitted through CAN communication. Referring to the P1 path, the hypervisor may output a CAN communication signal to the cluster application (app), so that the telltale trigger event can be delivered to the cluster app. According to this signal, the telltale (i.e., the warning light) can be turned on. If the telltale trigger event is not transmitted or incorrectly processed due to problems encountered in the cluster App or the middleware, there is no way to detect such erroneous operation of the telltale trigger event.

In order to address the above-described issues, the present disclosure proposes a method for adding the path P2 to the above-described example. The hypervisor may perform video capture of the cluster window only for signals related to the telltale trigger event for turning on telltale (or the warning light), and may transmit the captured result to a safety detector of the multimedia app. Here, the video capture may be performed after lapse of a predetermined time from a time point at which signals related to the telltale trigger event are received in consideration of a time delay for driving or implementing the cluster window.

Figure 8A:
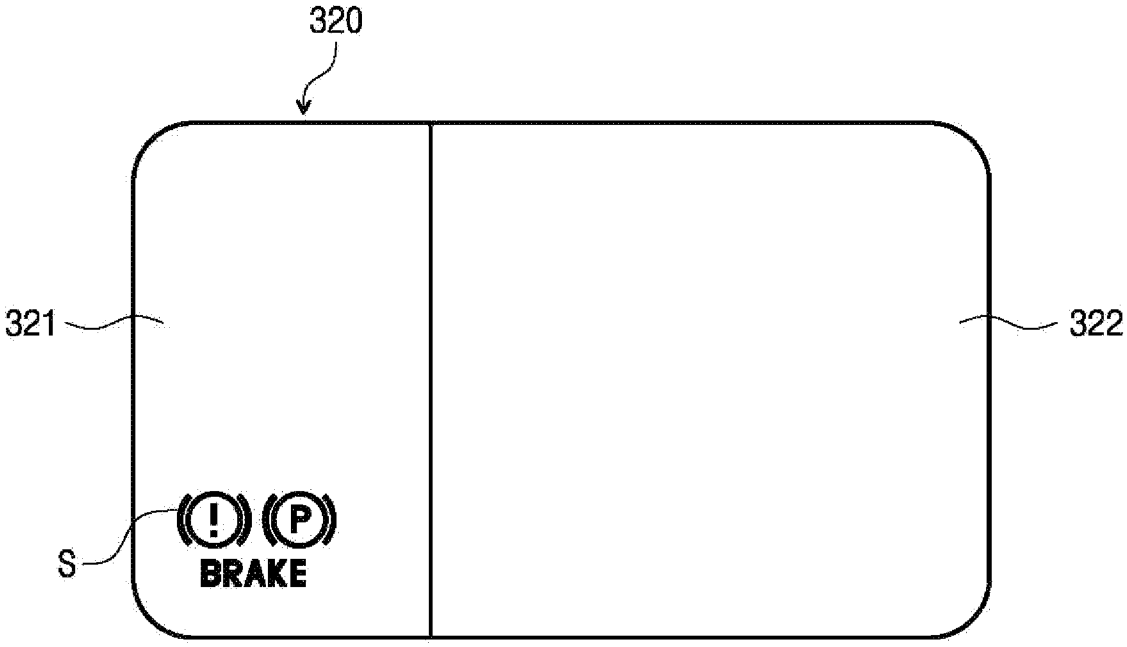
FIG. 8A and FIG. 8B are diagrams illustrating an example of warning lights that are displayed on the integrated monitor according to the present disclosure.
Figure 8B:
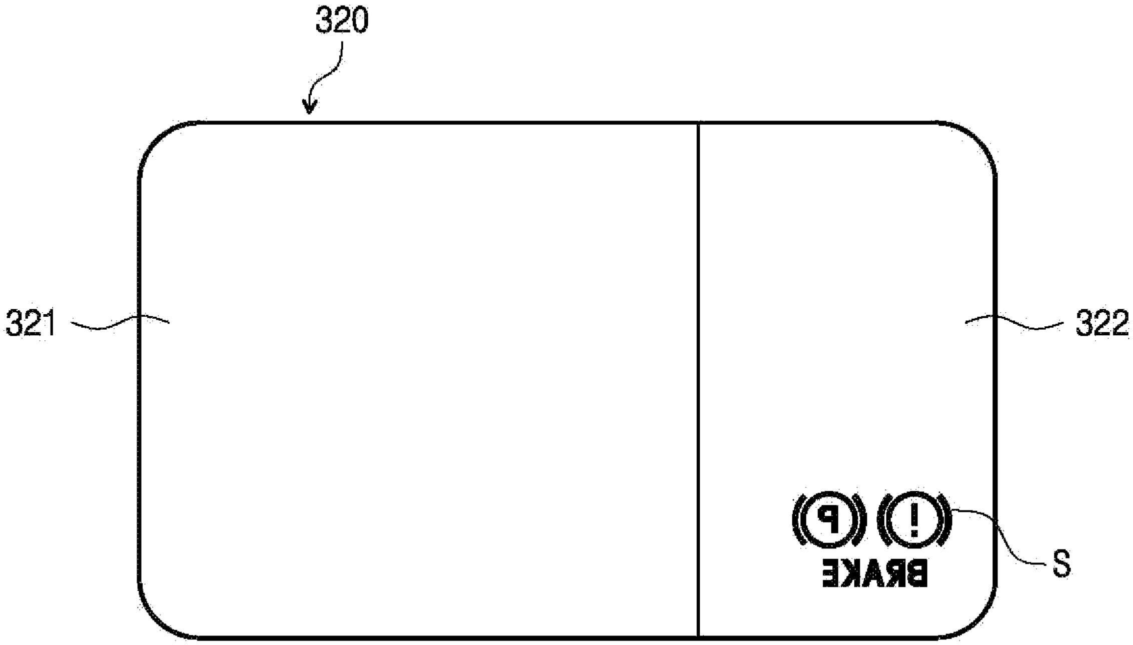

FIG. 8A and FIG. 8B are diagrams illustrating an example of warning lights (telltales) that are displayed on the integrated monitor according to the present disclosure.

Referring to FIG. 8A and FIG. 8B, the display 320 may include a cluster window 321 and a multimedia window 322. The telltale (or warning light) (S) shown in FIG. 8A and FIG. 8B may represent a braking (brake) telltale, and may indicate a warning about the parking brake being on, insufficient brake fluid, or worn brake pads. The scope of the present disclosure is not limited to the type or content of the telltales (or the warning lights) (S).

Referring to FIG. 8A, when a signal related to the telltale trigger event is received, the telltale(S) may be turned on (or displayed) on the cluster window 321. However, if the integrated monitor does not receive a signal related to the telltale trigger event from either the operating system (OS)/middleware for the cluster or the application (app) for the cluster or if there arises any processing error, the telltale(S) will not light up on the cluster window 321 or will not displayed on the cluster window 321. If the telltale (warning light) is not turned on, the user or driver of the vehicle will not be aware that the problem has occurred in the vehicle so that the user will continue to drive the vehicle, which may cause potential danger.

Accordingly, as shown in FIG. 8B, if the telltale(S) is not turned on (or does not light up on) in the cluster window 321 even if the signal related to the telltale trigger event has been received by the integrated monitor, the present disclosure can detect a non-lighting state of the telltale(S) and can enable the telltale(S) to be displayed on the multimedia window 322.

The operation of the integrated controller 630 for this purpose will now be described in detail with reference to the attached drawings.

Upon receiving a signal related to the telltale trigger event, the integrated controller 630 may perform video capture on the aforementioned cluster window 321 or may perform video capture on a display including the cluster window 321, and may thus obtain a captured image.

The integrated controller 630 may detect a telltale (warning light) image from the captured image. Since the area in which the telltale (warning light) is to be turned on is set in the cluster window 322, the integrated controller 630 may attempt to detect the telltale image in the telltale (warning light) region.

If the telltale image is successfully detected, the integrated controller 630 may compare the detected telltale image with the pre-stored telltale information, and may thus identify a telltale (warning light) corresponding to the detected telltale image.

If detection of the telltale image is not successful or identification of the telltale corresponding to the detected telltale image is not successful, the integrated controller 630 may identify telltale (warning light) information corresponding to the signal related to the received telltale trigger event. The integrated controller 630 may detect or select the identified telltale information from the pre-stored telltale information, and may control the telltale image corresponding to the identified telltale to be displayed on the multimedia window 322.

That is, when the integrated controller 630 confirms that the telltale (warning light) scheduled to be displayed on the cluster window 322 is not turned on, the integrated controller 630 may enable the corresponding telltale (S) to be displayed on the multimedia window 322.

Figure 9:
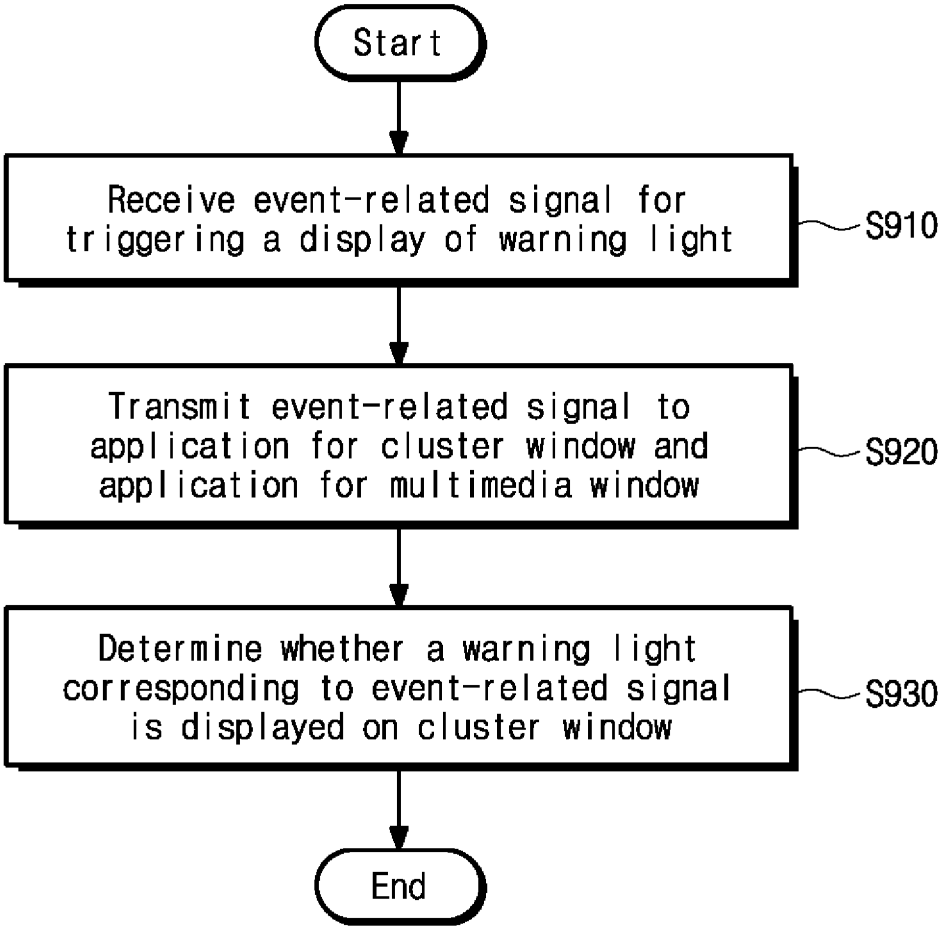
FIG. 9 is a flowchart illustrating a method for detecting a non-lighting state of one or more warning lights for an integrated monitor according to the present disclosure.

FIG. 9 is a flowchart illustrating a method for detecting a non-lighting state of the telltales (or warning lights) for the integrated monitor according to the present disclosure. The method of detecting a non-lighting state of the telltale (warning light) may be performed by an apparatus including an integrated display device consisting of a cluster window and a multimedia window and an integrated controller designed to control the integrated display device. Hereinafter, the "apparatus" or "device" will be described as performing the present method. The "apparatus" or "device" may be an apparatus for detecting the telltale (warning light) or an apparatus including the telltale detection apparatus.

Referring to FIG. 9, the apparatus may receive a signal related to a telltale trigger event (S910).

The apparatus may transmit the signal related to the telltale trigger event to the application (app) for the cluster window and another application (app) for the multimedia window (S920).

The apparatus may determine whether a telltale (warning light) corresponding to the signal related to the telltale trigger event is displayed on the cluster window (S930).

As the telltale (warning light) corresponding to the signal related to the telltale trigger event is turned on, the apparatus may finish performing the present method. In other words, this is because the telltale (warning light) was normally displayed on the integrated display device.

A detailed procedure for determining whether the telltale (warning light) corresponding to the signal related to the telltale trigger event is turned on will hereinafter be described in detail.

After a preset time delay from a time point where the signal related to the trigger event was transmitted, the apparatus may capture video or images displayed on the integrated display device. Video capture can be performed only for the cluster window from among the integrated display device, not for the entire integrated display device.

The apparatus can deliver the captured video to the application (app) for the multimedia window. This is because a normal operation of the app (cluster app) for the cluster window cannot be guaranteed.

The apparatus may determine whether the telltale (warning light) is not displayed on the cluster window based on the telltale (warning light) trigger event and the video captured by the app for the multimedia window. The apparatus may store information about all telltale (warning light) trigger events in advance. Accordingly, the apparatus can recognize which one of the telltale (warning light) trigger events is related to the signal related to the telltale trigger event, and can recognize the telltale (warning light) corresponding to the recognized telltale trigger event. The apparatus may attempt to detect previously stored telltale (warning light) information from the captured video. If detection of telltale (warning light) information in the captured video is not successful, the apparatus may determine that the telltale (warning light) is not displayed on the cluster window.

As the telltale (warning light) is not displayed on the cluster window, the apparatus may control the telltale (warning light) corresponding to the telltale (warning light) trigger event to be displayed on the multimedia window.

Meanwhile, the app for the cluster window and the app for the multimedia window may be implemented, installed, or operated on different guest operating systems (OSs).

In addition, the apparatus can perform operations of the integrated controller related to the present disclosure described in FIGS. 4 to 8 described above, which are not described with reference to FIG. 9.

Although the above-described embodiments of the present disclosure have disclosed that the device (or apparatus)

for controlling a user interface (UI) and components included therein perform such control for convenience of description, the device (or apparatus) and the components belonging thereto are names only and the scope of rights is not dependent thereon.

In other words, the proposed technology of the present disclosure may be performed by devices having names other than the control device. In addition, the method, scheme, or the like described above may be performed by software or code readable by a computer or other machine or device for vehicle control.

In addition, as another aspect of the present disclosure, the operation of the proposed technology described above may be provided as code that may be implemented, realized, or executed by a "computer" (a generic concept including a system on chip (SoC) or a (micro) processor) or a computer-readable storage medium, a computer program product, or the like storing or containing the code. The scope of the present disclosure is extendable to the code or the computer-readable storage medium or the computer program product storing or containing the code.

Detailed descriptions of preferred embodiments of the present disclosure disclosed as described above have been provided such that those skilled in the art may implement and realize the present disclosure.

Although the present disclosure has been described above with reference to preferred embodiments, those skilled in the art will understand that various modifications and changes can be made to the present disclosure set forth in the claims below.

Accordingly, the present disclosure is not intended to be limited to the embodiments shown herein but is to be accorded the widest scope consistent with the principles and novel features disclosed herein.

As is apparent from the above description, according to the solutions to the above-described problems, the present disclosure can prevent occurrence of a situation in which one or more warning lights are not displayed on the integrated monitor.

In addition, according to the present disclosure, a situation in which the warning lights are not displayed on the cluster area of the integrated monitor can be detected early, and a countermeasure for solving this situation can be started.

Additionally, the present disclosure can perform a suggestion function only in an event for turning on the warning lights, thereby reducing resource consumption.

The effects of the present disclosure are not limited to the effects described above. Other effects not described above can be understood by those skilled in the art from the description of the present disclosure below.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. An apparatus for detecting non-lighting of a warning light, the apparatus comprising:

an integrated display device configured to include a cluster window and a multimedia window; and an integrated controller operatively connected to the integrated display device and configured to control the integrated display device, wherein the integrated controller is further configured to:

in response to a reception of an event-related signal for triggering a display of the warning light, transmit the event-related signal to a first application for the cluster window and a second application for the multimedia window; and determine whether a warning light corresponding to the event-related signal is displayed on the cluster window.

2. The apparatus according to claim 1, wherein the first application for the cluster window and the second application for the multimedia window are installed and operated on different guest operating systems.

3. The apparatus according to claim 1, wherein the integrated controller is further configured to:

upon concluding that the warning light corresponding to the event-related signal is not displayed on the cluster window, control the warning light corresponding to the event-related signal to be displayed on the multimedia window.

4. The apparatus according to claim 1, wherein:

in order for the integrated controller to determine whether the warning light corresponding to the event-related signal is displayed on the cluster window, the integrated controller is further configured to:

capture an image displayed on the integrated display device after a predetermined time delay from a time point where the event-related signal has been transmitted;

transmit the captured image to the second application for the multimedia window; and allow the second application for the multimedia window to determine whether the warning light corresponding to the event-related signal is not displayed on the cluster window based on the captured image and the event-related signal.

5. The apparatus according to claim 4, wherein the integrated controller is further configured to:

attempt to detect a warning image corresponding to the event-related signal in the captured image; and in response that the warning image corresponding to the event-related signal is not detected in the captured image, conclude that the warning light corresponding to the event-related signal is not displayed in the cluster window.

6. A method for detecting non-lighting of a warning light, the method being performed by an apparatus that includes an integrated display device including a cluster window and a multimedia window and an integrated controller operatively connected to the integrated display device and configured for controlling the integrated display device, the method comprising:

receiving, by the integrated controller, an event-related signal for triggering a display of the warning light;

transmitting, by the integrated controller, the event-related signal to a first application for the cluster window and a second application for the multimedia window; and determining, by the integrated controller, whether a warning light corresponding to the event-related signal is displayed on the cluster window.

7. The method according to claim 6, wherein the first application for the cluster window and the second application for the multimedia window are installed and operated on different guest operating systems.

8. The method according to claim 6, further comprising:

upon concluding that the warning light corresponding to the event-related signal is not displayed on the cluster window, controlling, by the integrated controller, the warning light corresponding to the event-related signal to be displayed on the multimedia window.

9. The method according to claim 6, further comprising:

capturing, by the integrated controller, an image displayed on the integrated display device after a predetermined time delay from a time point where the event-related signal has been transmitted;

transmitting, by the integrated controller, the captured image to the second application for the multimedia window; and allowing, by the integrated controller, the second application for the multimedia window to determine whether the warning light corresponding to the event-related signal is not displayed on the cluster window based on the captured image and the event-related signal.

10. The method according to claim 9, further comprising:

attempting, by the integrated controller, to detect a warning image corresponding to the event-related signal in the captured image; and in response that the warning image is not detected in the captured image, concluding, by the integrated controller, that the warning light corresponding to the event-related signal is not displayed on the cluster window.

11. A vehicle for detecting non-lighting of a warning light, the vehicle comprising:

an integrated display device configured to include a cluster window and a multimedia window; and an integrated controller operatively connected to the integrated display device and configured to control the integrated display device, wherein the integrated controller is further configured to:

in response to a reception of an event-related signal for triggering a display of the warning light, transmit the event-related signal to a first application for the cluster window and a second application for the multimedia window; and determine whether a warning light corresponding to the event-related signal is displayed on the cluster window.

12. The vehicle according to claim 11, wherein the first application for the cluster window and the second application for the multimedia window are installed and operated on different guest operating systems.

13. The vehicle according to claim 11, wherein the integrated controller is further configured to:

upon concluding that the warning light corresponding to the event-related signal is not displayed on the cluster window, control the warning light corresponding to the event-related signal to be displayed on the multimedia window.

14. The vehicle according to claim 11, wherein:

in order for the integrated controller to determine whether the warning light corresponding to the event-related signal is displayed on the cluster window, the integrated controller is configured to:

capture an image displayed on the integrated display device after a predetermined time delay from a time point where the event-related signal has been transmitted;

transmit the captured image to the second application for the multimedia window; and allow the second application for the multimedia window to determine whether the warning light corresponding to the event-related signal is not displayed on the cluster window based on the captured image and the event-related signal.

15. The vehicle according to claim 14, wherein the integrated controller is further configured to:

attempt to detect a warning image corresponding to the event-related signal in the captured image; and in response that the warning image is not detected in the captured image, conclude that the warning light corresponding to the event-related signal is not displayed on the cluster window.

* * * * *